(12) United States Patent
Yu et al.

(10) Patent No.: US 12,093,777 B2
(45) Date of Patent: Sep. 17, 2024

(54) METHOD AND TERMINAL FOR IDENTIFYING BARCODE

(71) Applicant: Beijing Jingdong Zhenshi Information Technology Co., Ltd., Beijing (CN)

(72) Inventors: Haiming Yu, Beijing (CN); Zhiqiang Xi, Beijing (CN); Xiaonan Chen, Beijing (CN)

(73) Assignee: BEIJING JINGDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/013,822

(22) PCT Filed: May 10, 2021

(86) PCT No.: PCT/CN2021/092575
§ 371 (c)(1),
(2) Date: Dec. 29, 2022

(87) PCT Pub. No.: WO2022/007495
PCT Pub. Date: Jan. 13, 2022

(65) Prior Publication Data
US 2023/0297795 A1        Sep. 21, 2023

(30) Foreign Application Priority Data

Jul. 8, 2020   (CN) .......................... 202010651446.6

(51) Int. Cl.
*G06K 7/14*        (2006.01)
(52) U.S. Cl.
CPC .................. *G06K 7/1413* (2013.01)

(58) Field of Classification Search
CPC .......................... G06K 7/1413; G06K 7/10811
(Continued)

(56) References Cited

U.S. PATENT DOCUMENTS 8,608,075 B2    12/2013  Tanimoto et al.
2007/0091332 A1  4/2007  Nunnink
(Continued)

FOREIGN PATENT DOCUMENTS

CN    101346730 A    1/2009
CN    102737217 A    10/2012
(Continued)

OTHER PUBLICATIONS

International Search Report for PCT/CN2021/083735, dated Jul. 27, 2021, 5 pgs.
(Continued)

*Primary Examiner* — Toan C Ly
(74) *Attorney, Agent, or Firm* — BLANK ROME LLP

(57) ABSTRACT

The present disclosure relates to the field of information identification. Disclosed are a method and terminal for identifying a barcode. The method comprises: obtaining an image of a barcode, and according to the calibration information of a preset calibration region, identifying the position of the calibration region in the image; identifying the position of an information code region in the image according to the position of the calibration region in the image, and a preset position relationship between the calibration region and the information code region in the image; and acquiring information on the position of the information code region in the image to obtain the information of the information code region.

17 Claims, 4 Drawing Sheets

(58) Field of Classification Search
USPC .................................................. 235/462.41
See application file for complete search history.

(56) References Cited

U.S. PATENT DOCUMENTS

| | | | |
|---|---|---|---|
| 2011/0085732 A1* | 4/2011 | Cheng | G06K 7/14 |
| | | | 235/462.11 |
| 2012/0248190 A1 | 10/2012 | Ogawa et al. | |
| 2013/0301870 A1* | 11/2013 | Mow | G06T 1/0021 |
| | | | 382/100 |
| 2016/0104016 A1 | 4/2016 | Deal et al. | |
| 2018/0137318 A1 | 5/2018 | Canini et al. | |
| 2019/0035129 A1 | 1/2019 | Hutchinson | |

FOREIGN PATENT DOCUMENTS

| | | |
|---|---|---|
| CN | 203386219 U | 1/2014 |
| CN | 104268517 A | 1/2015 |
| CN | 104376291 A | 2/2015 |
| CN | 107818282 A | 3/2018 |
| CN | 207216659 U | 4/2018 |
| CN | 108491748 A | 9/2018 |
| CN | 109214225 A | 1/2019 |
| CN | 109598162 A | 4/2019 |
| CN | 109977718 A | 7/2019 |
| CN | 110749974 A | 2/2020 |
| CN | 111797643 A | 10/2020 |
| JP | 2012208797 A | 10/2012 |

OTHER PUBLICATIONS

Chinese Office Action for CN202010651446.6, dated Dec. 23, 2021, 5 pgs.
Chinese Office Action for CN202010651446.6, dated Feb. 16, 2022, 4 pgs.
Chinese Office Action for CN202010651446.6, dated Mar. 3, 2021, 10 pgs.
Y. Chen, et al., "Barcoded Sequencing Workflow for High Throughput Digitization of Hybridoma Antibody Variable Domain Sequences", Journal of Immunological Methods, vol. 455; 2018; pp. 88-94.
Z. Lin., et al., "A CMOS Image Sensor for Multi-Level Focal Plane Image Decomposition", IEEE Transactions on Circuits and Systems—I: Regular Papers; vol. 55, No. 9, Oct. 2008, 12 pgs.
Z. Guanping, "Research on Invisible Two-Dimensional Code Design and Scanning System Based on Ultrasonic Phased Array", South China University of Technology, 2012, 68 pgs.
Wen-jing Liao, et al., "Research on an Improved Bar Code Image Enhancement and Location Algorithms in Complex Environment", www.moderncomputer.cn; 2020; 9 pgs.

* cited by examiner

METHOD AND TERMINAL FOR IDENTIFYING BARCODE

CROSS-REFERENCE TO RELATED APPLICATIONS

This patent application is a U.S. National Stage of International Application No. PCT/CN2021/092575, filed on May 10, 2021, which claims priority to Chinese Patent Application No. 202010651446.6 filed on Jul. 8, 2020 and entitled "METHOD AND TERMINAL FOR IDENTIFYING BARCODE", which are incorporated herein by reference.

TECHNICAL FIELD

Embodiments of the present disclosure relate to the field of computer technology, specifically to the field of information identification technology, and in particular, to a method and terminal for identifying a barcode.

BACKGROUND

Barcodes are often used as unique identifiers of goods in logistics distribution, or warehouse and supermarket management of goods. Logistics companies or warehouses and supermarkets need to be equipped with equipment such as barcode scanners or sales terminals (POS machines) to scan and identify the barcodes of goods. However, the barcode scanners or sales terminals need to be purchased additionally, which will increase the operating costs of merchants, so highly popular mobile terminals with camera terminals such as mobile phones or tablet computers have become substitutes for the barcode scanners or sales terminals to scan and identify the barcodes.

SUMMARY

The present disclosure provides a method and terminal for identifying a barcode, an electronic device, and a computer-readable storage medium.

According to a first aspect, embodiments of the present disclosure provide a method for identifying a barcode, wherein the barcode comprises a calibration region and an information code region, and the method comprises: obtaining an image of the barcode, and identifying a position of the calibration region in the image according to preset calibration information of the calibration region; identifying a position of the information code region in the image according to the position of the calibration region in the image and a preset position relationship between the calibration region and the information code region in the image; and acquiring information based on the position of the information code region in the image to obtain information of the information code region.

In some embodiments, obtaining an image of the barcode, and identifying a position of the calibration region in the image according to preset calibration information of the calibration region comprises: obtaining a predetermined optimal focus time; and obtaining the image of the barcode, and identifying the position of the calibration region in the image within the optimal focus time according to the preset calibration information of the calibration region.

In some embodiments, the optimal focus time is determined as follows, comprising: performing, when the position of the calibration region in the image is not identified out within a preset identification time t, iteratively a first operation: updating the preset identification time to be $t=t+\Delta 1$, and identifying the position of the calibration region in the image within the updated preset identification time t; stopping, in response to the position of the calibration region in the image being identified out within the updated preset identification time t, performing the first operation, and determining the preset identification time t updated in the last of the first operation as the optimal focus time, wherein $\Delta 1$ is a first preset time length; and performing, when the position of the calibration region in the image is identified out within the preset identification time t, iteratively a second operation: updating the preset identification time to be $t=t-\Delta 2$, and identifying the position of the calibration region in the image within the updated preset identification time; stopping, in response to the position of the calibration region in the image being not identified out within the updated preset identification time t, performing the second operation, and determining the preset identification time t updated in the second last of the second operation as the optimal focus time, wherein $\Delta 2$ is a second preset time length.

In some embodiments, the calibration region comprises a front calibration region and a rear calibration region, and the information code region is located between the front calibration region and the rear calibration region.

In some embodiments, acquiring information based on the position of the information code region in the image to obtain information of the information code region comprises: focusing on the position of the information code region in the image to collect image information of the information code region; and binarizing the image information of the information code region to obtain the information of the information code region.

In some embodiments, focusing on the position of the information code region in the image comprises: determining a length of the information code region according to a preset length of the front calibration region, a preset length of the rear calibration region, a preset interval width between the front calibration region and the information code region, and a preset interval width between the rear calibration region and the information code region; selecting half of the length of the information code region as a focus width; and focusing on the position of the information code region in the image by using the focus width.

In some embodiments, a difference between a width of a single black striped region of the calibration region and a width of a single black striped region of the information code region is greater than a preset width difference.

According to a second aspect, embodiments of the present disclosure provide a terminal for identifying a barcode, wherein the barcode comprises a calibration region and an information code region, and the terminal comprises an image capture device, a processor, and a display, wherein the image capture device is configured to obtain an image of the barcode and send the image of the barcode to the processor; the processor is configured to receive the image of the barcode, identify a position of the calibration region in the image according to preset calibration information of the calibration region, identify a position of the information code region in the image according to the position of the calibration region in the image and a preset position relationship between the calibration region and the information code region in the image, determine focus information used to control a focus position of the image capture device according to the position of the information code region in the image, and send the focus information to the image capture device; the image capture device is further configured to perform image capture according to the focus information, obtain an image of the information code region, and send the image of the information code region to the processor; and the processor is further configured to receive the image of the information code region, identify information of the information code region according to the image of the information code region, and send the information of the information code region to the display; the display is configured to receive and display the information of the information code region.

In some embodiments, the processor comprises: a time selection module, configured to obtain a predetermined optimal focus time; and a position identification module, configured to identify, based on the image of the barcode, the position of the calibration region in the image within the optimal focus time according to the preset calibration information of the calibration region.

In some embodiments, the optimal focus time is determined as follows: performing, when the position of the calibration region in the image is not identified out within a preset identification time t, iteratively a first operation: updating the preset identification time to be t=t+Δ1, and controlling the image capture device to capture a regional image based on the position of the calibration region in the image; stopping, in response to the processor identifying the position of the calibration region in the image out according to the regional image captured by the image capture device within the updated preset identification time t, performing the first operation, and determining the preset identification time t updated in the last of the first operation as the optimal focus time, wherein Δ1 is a first preset time length; and performing, when the position of the calibration region in the image is identified out within the preset identification time t, iteratively a second operation: updating the preset identification time to be t=t−Δ2, and controlling the image capture device to capture a regional image on the position of the calibration region in the image; stopping, in response to the processor not identifying the position of the calibration region in the image out according to the regional image captured by the image capture device within the updated preset identification time t, performing the second operation, and determining the preset identification time t updated in the second last of the second operation as the optimal focus time, wherein Δ2 is a second preset time length.

In some embodiments, the calibration region comprises a front calibration region and a rear calibration region, and the information code region is located between the front calibration region and the rear calibration region.

In some embodiments, the processor comprises: a focus module, configured to determine a focus parameter according to the position of the information code region in the image, and send the focus parameter to the image capture device, so that the image capture device captures the image of the information code region according to the focus parameter; and a processing module, configured to receive the image of the information code region captured by the image capture device, and binarize the image information of the information code region to obtain the information of the information code region.

In some embodiments, the focus module comprises: a determination module, configured to determine a length of the information code region according to a preset length of the front calibration region, a preset length of the rear calibration region, a preset interval width between the front calibration region and the information code region, and a preset interval width between the rear calibration region and the information code region; and a selection module, configured to select half of the length of the information code region as a focus width, and send the focus width to the image capture device; wherein the image capture device comprises: a focus sub-module, configured to receive the focus width and focus on the position of the information code region in the image based on the focus width.

In some embodiments, a difference between a width of a single black striped region of the calibration region and a width of a single black striped region of the information code region is greater than a preset width difference.

In some embodiments, the display is further configured to receive and display the image of the information code region.

According to a third aspect, embodiments of the present disclosure provide an electronic device, comprising: one or more processors; and a memory, storing one or more programs, wherein the one or more programs, when executed by the one or more processors, cause the one or more processors to implement the method for identifying a barcode provided by the first aspect.

According to a fourth aspect, embodiments of the present disclosure provide a computer-readable medium, storing a computer program thereon, wherein the program, when executed by a processor, causes the processor to implement the method for identifying a barcode provided by the first aspect.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for better understanding of this solution, and do not constitute a limitation to the present disclosure.

DETAILED DESCRIPTION OF EMBODIMENTS

Exemplary embodiments of the present disclosure are described below with reference to the accompanying drawings, which include various details of the embodiments of the present disclosure to facilitate understanding, and should be considered as exemplary only. Accordingly, those ordinary skilled in the art should recognize that various changes and modifications can be made to the embodiments described herein without departing from the scope and spirit of the present disclosure. Also, descriptions of well-known functions and constructions are omitted from the following description for clarity and conciseness.

Figure 1:
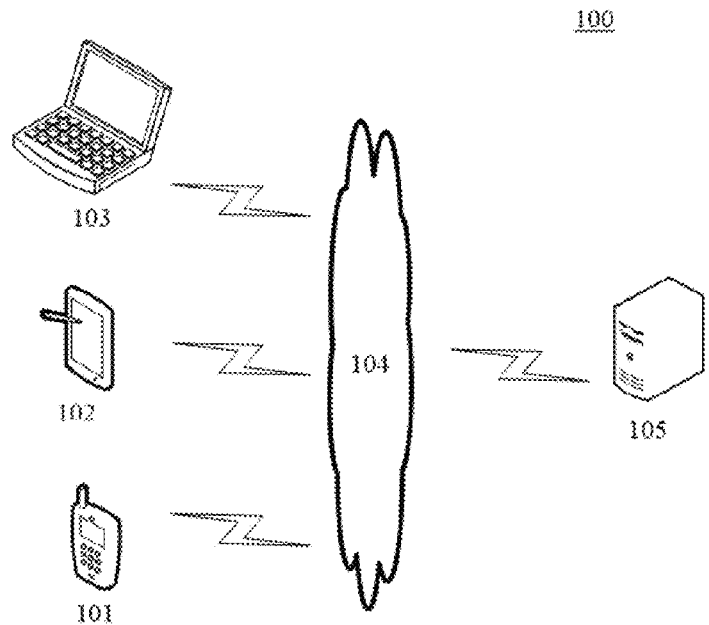
FIG. 1 is an architectural diagram of an exemplary system to which embodiments of the present disclosure may be applied.

FIG. 1 illustrates an exemplary system architecture 100 to which embodiments of a method for identifying a barcode or a terminal for identifying a barcode according to the present disclosure may be applied.

As shown in FIG. 1, the system architecture 100 may include a terminal device 101, 102 or 103, a network 104, and a server 105. The network 104 serves as a medium providing a communication link between the terminal device 101, 102 or 103 and the server 105. The network 104 may include various types of connections, such as wired or wireless communication links, or optical fiber cables.

A user may use the terminal device 101, 102 or 103 to interact with the server 105 through the network 104 to receive or send messages and the like. Various client applications, such as an image scanning application, a pattern identification application and an information processing application, may be installed in the terminal device 101, 102 or 103.

The terminal devices 101, 102 or 103 may be various electronic devices that have a display screen and a camera device and support receiving server messages, including but not limited to a smart phone, a tablet computer, a barcode scanner, etc. The terminal device 101, 102 or 103 may acquire a barcode image by means of a camera thereon, and process and identify the barcode image by using a local data processing program to obtain barcode information.

The terminal device 101, 102 or 103 may be hardware or software. When the terminal device 101, 102 or 103 is hardware, it may be various electronic devices, and when the terminal device 101, 102 or 103 is software, it may be installed in the electronic devices listed above. The terminal device may be implemented as a plurality of software programs or software modules (for example, a plurality of software modules for providing distributed services), or as a single software program or software module. Specific limitations are not provided here.

The server 105 may be a server that provides background services for applications running on the terminal device 101, 102 or 103, or a server that provides support for image scanning applications or image identification applications running on the terminal device 101, 102 or 103. The server 105 may acquire the barcode image from the terminal device 101, 102 or 103, process the barcode image with an image processing program, identify barcode information, and return the processed barcode information to the terminal device 101, 102 or 103.

It should be noted that the method for identifying a barcode, provided by the embodiments of the present disclosure, is generally performed by the terminal device 101, 102 or 103, and correspondingly, the terminal for identifying a barcode is generally the terminal device 101, 102 or 103.

It should be understood that the numbers of the terminal devices, the network and the server in FIG. 1 are merely illustrative. Any number of terminal devices, networks and servers may be provided based on actual requirements.

Figure 2:
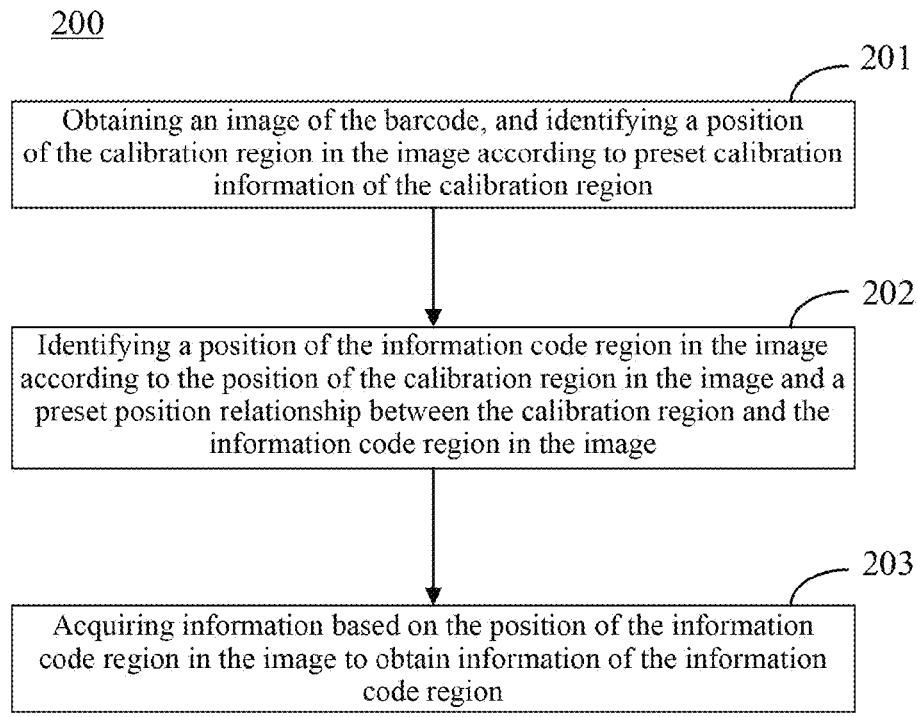
FIG. 2 is a flowchart of an embodiment of a method for identifying a barcode according to the present disclosure.

With continued reference to FIG. 2, a flow 200 of an embodiment of a method for identifying a barcode according to the present disclosure is shown. A method for identifying the barcode is provided. The barcode includes a calibration region and an information code region. The method includes the following steps.

Step 201: obtaining an image of the barcode, and identifying a position of the calibration region in the image according to preset calibration information of the calibration region.

In this embodiment, the barcode includes the calibration region and the information code region. The calibration region includes a code pattern formed according to a preset coding rule, and the calibration region is configured to assist in locating the position of the information code region in the image. The information code region includes a code pattern that contains information to be identified of the barcode. A executive body (for example, the terminal device shown in FIG. 1) of the method for identifying the barcode may capture the image with the barcode by a camera thereon, and identify the position of the calibration region in the image according to the preset information of the calibration region. The preset information of the calibration region may be represent by a barcode pattern with high contrast or other features such as graphics and colors and the like that are easy to be distinguished by a machine. For example, the order of black and white color blocks in the barcode is: black, black, white, white, black, black, black, black, black, white, white, and black, so that the camera can quickly capture the code pattern and start to identify and locate, so as to avoid wasting identification time due to large-area scanning and reading are performed to the barcode image by the camera.

Optionally, in this embodiment, first, a predetermined optimal focus time is obtained, then the image of the barcode is captured, and the position of the calibration region in the image is identified within the optimal focus time according to the preset calibration information of the calibration region.

Specifically, the optimal focus time may be determined empirically or by multiple experiments. Then, the image of the barcode is captured, and the position of the calibration region in the image is identified within the optimal focus time according to the preset calibration information of the calibration region. The calibration is stopped when the optimal focus time is exceeded.

Optionally, in this embodiment, when the position of the calibration region in the image is not identified out within a preset identification time t, a first operation is iteratively performed: updating the preset identification time to be $t=t+\Delta 1$, and identifying the position of the calibration region in the image within the updated preset identification time t; and stopping, in response to the position of the calibration region in the image being identified out within the updated preset identification time t, performing the first operation, and determining the preset identification time t updated in the last first operation as a first optimal focus time, where $\Delta 1$ is a first preset time length.

Specifically, when the terminal device is used for the first time, the terminal device is restarted, or the terminal device needs to be calibrated, and the position of the calibration region in the image is not identified out within the preset identification time t, the following first operation is iteratively performed: updating the preset identification time to be $t=t+\Delta 1$, then determining whether the position of the calibration region in the image is identified out within the updated preset identification time t, and if the position of the calibration region in the image cannot be identified out, continuing to perform the first operation to update the preset identification time until the position of the calibration region in the image is identified out, then stopping performing the first operation, and determining the preset identification time t updated in the last of the first operation as the first optimal focus time, where $\Delta 1$ is the first preset time length. For example, the preset identification time t is initially set to be 300 milliseconds (ms), the first preset time length Δ1 is 100 ms, and the position of the calibration region in the image is identified within t=300 ms. If the position of the calibration region in the image cannot be identified, then the preset identification time t is updated to be 300 ms+100 ms=400 ms, and then, whether the position of the calibration region in the image is identified out within the updated preset identification time t=400 ms is determined. If the position of the calibration region in the image cannot be identified, then the preset identification time continues to be identified. If the position of the calibration region in the image is identified out within the updated preset identification time t=400 ms, then t=400 ms is determined as the first optimal focus time.

Optionally, in this embodiment, when the position of the calibration region in the image can be identified out within the preset identification time t, a second operation is iteratively performed: updating the preset identification time to be t=t−Δ2, and identifying the position of the calibration region in the image within the updated preset identification time; and stopping, in response to the position of the calibration region in the image being not identified out within the updated preset identification time t, performing the second operation, and determining the preset identification time t updated in the second last of the second operation as a second optimal focus time, where Δ2 is a second preset time length.

Specifically, when the terminal device is used for the first time, the terminal device is restarted, or the terminal device needs to be calibrated, and the position of the calibration region in the image is identified out within the preset identification time t, the following second operation is iteratively performed: updating the preset identification time to be t=t−Δ2, then determining whether the position of the calibration region in the image is identified out within the updated preset identification time t, and if the position of the calibration region in the image is identified out, continuing to perform the second operation to update the preset identification time until the position of the calibration region in the image cannot be identified out, then stopping performing the second operation, and determining the preset identification time t updated in the second last of the second operation as the second optimal focus time, where Δ2 is the second preset time length. For example, the preset identification time t is initially set to be 600 ms, the first preset time length Δ1 is 100 ms, and the position of the calibration region in the image is identified within t=600 ms. If the position of the calibration region in the image can be identified, then the preset identification time t is updated to be 600 ms-100 ms=500 ms, and then, whether the position of the calibration region in the image is identified out within the updated preset identification time t=500 ms is determined. If the position of the calibration region in the image can be identified, the preset identification time t continues to be updated to be 500 ms-100 ms=400 ms, and then whether the position of the calibration region in the image is identified out within the updated preset identification time t=400 ms) is determined. If the position of the calibration region in the image cannot be identified, the second operation is stopped, and t=500 ms is determined as the second optimal focus time.

In this embodiment, the optimal focus time is gradually sought in an iterative way when the terminal device is used for the first time, restarted or calibrated, and the optimal focus time is applied in subsequent scanning and identification, which can improve the barcode identification efficiency and ensure the barcode identification accuracy.

Step 202: identifying a position of the information code region in the image according to the position of the calibration region in the image and a preset position relationship between the calibration region and the information code region in the image.

In this embodiment, the position of the information code region in the image is determined according to the position of the calibration region in the image and the preset position relationship between the calibration region and the information code region in the image. The preset position relationship between the calibration region and the information code region in the image may be an azimuth relationship between the calibration region and the information code region in the image, for example, the information code region is located above, below, on the left or right of, or in a diagonal direction of the calibration region. The preset position relationship between the calibration region and the information code region in the image may be a distance relationship between the calibration region and the information code region in the image, for example, the information code region is located within 3 pixels of the calibration region, the information code region is located within 1 cm of the calibration region, the information code region starts at 1 cm to the right of the calibration region, etc.

Step 203: acquiring information based on the position of the information code region in the image to obtain information of the information code region.

In this embodiment, after the position of the information code region in the image is identified out, the information is acquired based on the position of the information code region in the image to obtain and identify the information of the information code region.

According to the method for identifying the barcode provided by the present disclosure, the calibration region is first identified through the preset information, and then focused identification is performed on the information code region according to the position relationship between the calibration region and the information code region, thereby improving the efficiency and accuracy of identifying barcode information.

Figure 3:
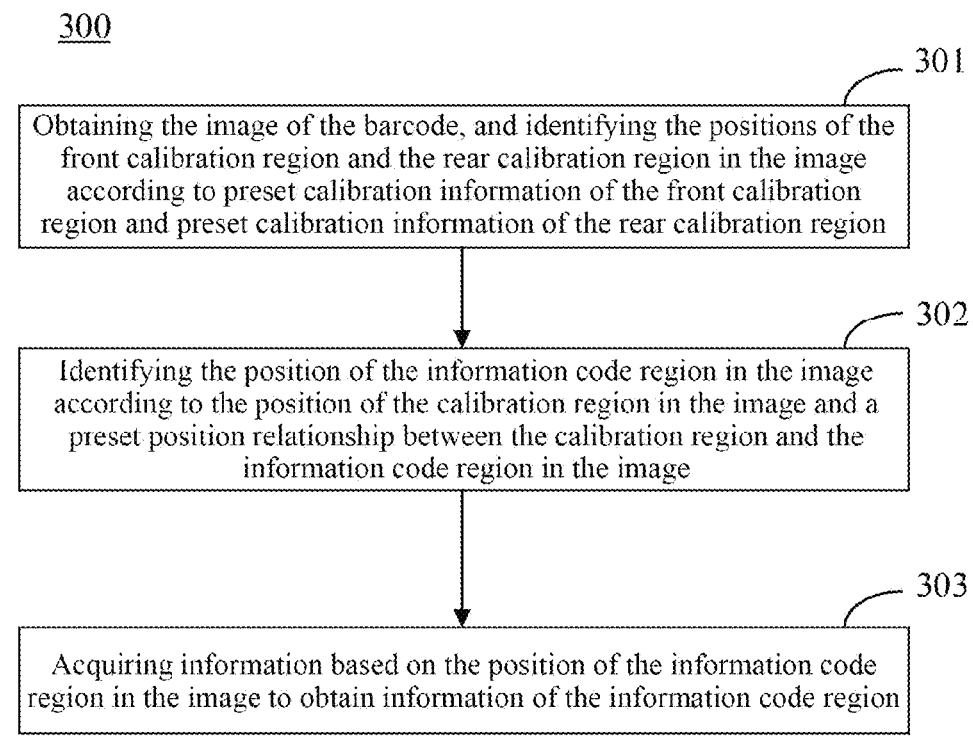
FIG. 3 is a flowchart of another embodiment of a method for identifying a barcode according to the present disclosure.
Figure 4:
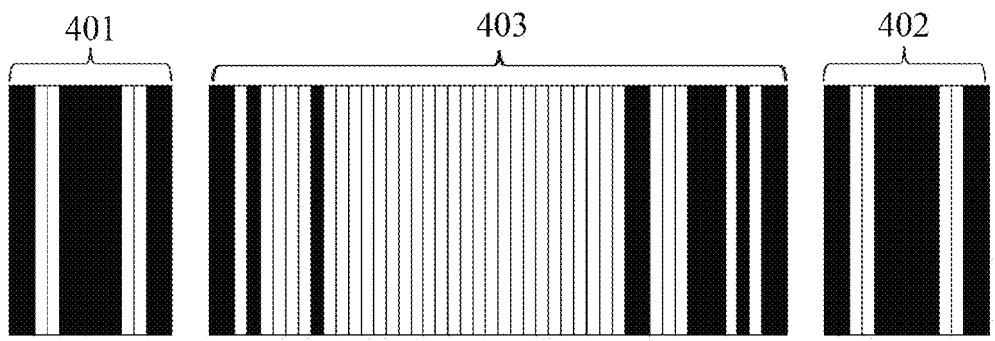
FIG. 4 is a schematic diagram of a barcode in another embodiment of the method for identifying a barcode according to the present disclosure.

With further reference to FIG. 3, a flow 300 of another embodiment of a method for identifying the barcode is shown. The schematic diagram of the barcode in this embodiment is referenced to FIG. 4. the calibration region includes a front calibration region 401 and a rear calibration region 402, and the information code region 403 is located between the front calibration region 401 and the rear calibration region 402. The method includes the following steps.

Step 301: obtaining the image of the barcode, and identify positions of the front calibration region and the rear calibration region in the image according to preset calibration information of the front calibration region and preset calibration information of the rear calibration region.

In this embodiment, the image of the barcode is first obtained, then the positions information of the front calibration region and the rear calibration region in the image are determined according to the preset calibration information of the front calibration region and the rear calibration region, respectively, and the positions of the front calibration region and the rear calibration region in the image are further determined based on the positions information of the front calibration region and the rear calibration region in the image, respectively. The front calibration region is a code pattern formed according to a preset coding rule and placed in front of the information code region, and the rear calibration region is a code pattern formed according to the preset coding rule and placed in back of the information code region.

Step 302: identifying the position of the information code region in the image according to the position of the calibration region in the image and the preset position relationship between the calibration region and the information code region in the image.

In this embodiment, according to the positions of the front calibration region and the rear calibration region in the image, and the preset position relationship between the calibration region and the information code region in the image, that is, the information code region is located between the front calibration region and the rear calibration region, a middle region between the position of the front calibration region in the image and the position of the rear calibration region in the image is determined as the position of the information code region in the image.

Step 303: acquiring information based on the position of the information code region in the image to obtain information of the information code region.

In this embodiment, after the position of the information code region in the image is identified out, information is acquired based on the position of the information code region in the image to obtain and identify the information of the information code region.

In some optional implementations of the embodiments described above in conjunction with FIG. 2 and FIG. 3, acquiring information based on the position of the information code region in the image to obtain information of the information code region includes: focusing on the position of the information code region in the image to collect image information of the information code region; and binarizing the image information of the information code region to obtain the information of the information code region.

In this embodiment, the position of the information code region in the image may be focused, an image of the information code region is captured, the image is binarized to present a black and white effect, and then the binarized image of the information code region is processed by using a barcode identification algorithm (for example, a Code128 identification algorithm) to obtain information of the image of the information code region, that is, the information of the barcode. In this embodiment, by setting the front calibration region and the rear calibration region, the information code region is located more easily when the barcode is scanned, and the focused identification of the information code region can further improve the efficiency of identifying a barcode with the terminal device such as a mobile phone or a tablet computer.

Optionally, when the calibration region includes the front calibration region and the rear calibration region and the information code region is located between the front calibration region and the rear calibration region, focusing on the position of the information code region in the image includes: determining a length of the information code region according to a preset length of the front calibration region, a preset length of the rear calibration region, a preset interval width between the front calibration region and the information code region, and a preset interval width between the rear calibration region and the information code region; selecting half of the length of the information code region as a focus width; and focusing on the position of the information code region in the image by using the focus width.

In this embodiment, before the position of the information code region in the image is focused, the length of the information code region may be first determined according to the preset length of the front calibration region, the preset length of the rear calibration region, the preset interval width between the front calibration region and the information code region, and the preset interval width between the rear calibration region and the information code region, then the half of the length of the information code region is selected as the focus width, and the position of the information code region in the image is focused based on the focus width. The length of the information code region can be accurately calculated by using the method of this embodiment, and the half of the length of the information code region is used as the focus width to perform focused identification on the information code region, such that the focusing efficiency is improved, and thus the identification efficiency is improved.

In some optional implementations of the embodiments described above in conjunction with FIG. 2 and FIG. 3, the difference between the width of a single black striped region of the calibration region and the width of the single black striped region of the information code region is greater than a preset width difference.

In this embodiment, the single black striped region of the calibration region is wider than the single black striped region of the information code region, and the difference between the width of the single black striped region of the calibration region and the width of the single black striped region of the information code region is greater than the preset width difference. The single black striped region of the calibration region is preset to be wider than the single black striped region of the information code region, which enables the camera to locate the calibration region faster and more accurately, thereby improving the efficiency of identifying the barcode.

According to the method for identifying the barcode provided by the present disclosure, the calibration region is first identified through the preset information, and then focused identification is performed on the information code region according to the position relationship between the calibration region and the information code region, thereby improving the efficiency and accuracy of identifying barcode information.

Figure 5:
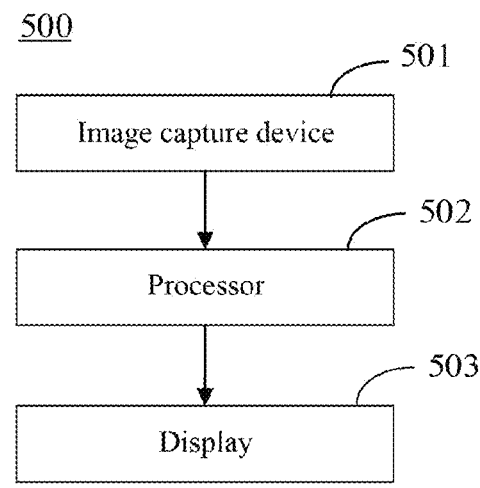
FIG. 5 is a schematic structural diagram of an embodiment of a terminal for identifying a barcode according to the present disclosure.

With further reference to FIG. 5, as an implementation of the methods shown in the above figures, the present disclosure provides an embodiment of a terminal for identifying a barcode. The embodiment of the terminal corresponds to the embodiment of the method shown in FIG. 2. Specifically, the terminal may be applied to various electronic devices.

As shown in FIG. 5, the terminal 500 for identifying a barcode in this embodiment, the barcode includes a calibration region and an information code region, and the terminal 500 includes: an image capture device 501, a processor 502, and a display 503. The image capture device 501 is configured to obtain an image of the barcode and send the image of the barcode to the processor. The processor 502 is configured to receive the image of the barcode, identify a position of the calibration region in the image according to preset calibration information of the calibration region, identify the position of the information code region in the image according to the position of the calibration region in the image and a preset position relationship between the calibration region and the information code region in the image, determine, according to the position of the information code region in the image, focus information used to control the focus position of the image capture device, and send the focus information to the image capture device 501. The image capture device 501 performs image capture according to the focus information to obtain an image of the information code region, and sends the image of the information code region to the processor 502. The processor 502 receives the image of the information code region, identifies information of the information code region according to the image of the information code region, and sends the information of the information code region to the display 503. The display 503 is configured to receive and display the information of the information code region.

In this embodiment, the barcode includes a calibration region and an information code region. The calibration region includes a code pattern formed according to a preset coding rule, and the calibration region is configured to assist in locating the position of the information code region in the image. The information code region includes a code pattern that contains information to be identified of the barcode. The terminal 500 may capture an image with the barcode by means of the image capture device 501, and send the image of the information code region to the processor 502, and the processor 502 receives the image of the information code region, and determines the position of the information code region in the image according to the position of the calibration region in the image and the preset position relationship between the calibration region and the information code region in the image. The processor 502 determines, according to the position of the information code region in the image, the focus information used to control the focus position of the image capture device, and sends the focus information to the image capture device 501. After the image capture device 501 receives the focus information, device focus parameters of the image capture device are adjusted according to the focus information, image capture is performed by using the adjusted image capture device to obtain the image of the information code region, and the captured image of the information code region is sent to the processor 502. After receiving the image of the information code region, the processor 502 identifies the information of the information code region according to the image of the information code region, and sends the information of the information code region to the display 503. The display 503 receives the information of the information code region and displays the information.

In some embodiments, the processor 502 includes: a time selection module, configured to obtain a predetermined optimal focus time; and a position identification module, configured to identify, based on the image of the barcode, the position of the calibration region in the image within the optimal focus time according to the preset calibration information of the calibration region.

In this embodiment, the time selection module in the processor 502 may receive an optimal focus time empirically determined and input by a terminal user. Then, the processor 502 identifies, based on the image of the barcode captured by the image capture device 501, the position of the calibration region in the image within the optimal focus time according to the preset calibration information of the calibration region, and stops the identification when the optimal focus time is exceeded. The position identification module in the processor 502 determines the position of the information code region in the image according to the position of the calibration region in the image and the preset position relationship between the calibration region and the information code region in the image.

In some embodiments, the optimal focus time is determined as follows: performing, when the position of the calibration region in the image is not identified out within a preset identification time t, iteratively a first operation: updating the preset identification time to be $t=t1+\Delta 1$, and controlling the image capture device to capture a regional image on the position of the calibration region in the image; in response to the processor identifying the position of the calibration region in the image out according to the regional image captured by the image capture device within the updated preset identification time t, stopping performing the first operation, and determining the preset identification time t updated in the last of the first operation as the optimal focus time, where t1 is an actual identification time, and $\Delta 1$ is a first preset time length; when the position of the calibration region in the image can be identified out within the preset identification time t, iteratively performing a second operation: updating the preset identification time to be $t=t2-\Delta 2$, and controlling the image capture device to capture a regional image on the position of the calibration region in the image; in response to the processor not identifying the position of the calibration region in the image out according to the regional image captured by the image capture device within the updated preset identification time t, stopping performing the second operation, and determining the preset identification time t updated in the second last of the second operation as the optimal focus time, where t2 is an actual identification time, and $\Delta 2$ is a second preset time length.

In this embodiment, when the terminal device is used for the first time, the terminal device is restarted, or the terminal device needs to be calibrated, and the position of the calibration region in the image is not identified out within the preset identification time t, the processor 502 iteratively performs the following first operation: updating the preset identification time to be $t=t+\Delta 1$, and controlling the image capture device 501 to capture a regional image on the position of the calibration region in the image. Then the processor 502 determines whether the position of the calibration region in the image is identified out within the updated preset identification time t. If the position of the calibration region in the image cannot be identified out, the processor 502 continues to perform the first operation to update the preset identification time until the position of the calibration region in the image is identified out, then stops performing the first operation, and determines the preset identification time t updated in the last of the first operation as a first optimal focus time, where $\Delta 1$ is a first preset time length.

In this embodiment, when the terminal device is used for the first time, the terminal device is restarted, or the terminal device needs to be calibrated, and the position of the calibration region in the image is identified out within the preset identification time t, the processor 502 iteratively performs the following second operation: updating the preset identification time to be $t=t-\Delta 2$, and controlling the image capture device 501 to capture a regional image on the position of the calibration region in the image. Then the processor 502 determines whether the position of the calibration region in the image is identified out within the updated preset identification time t. If the position of the calibration region in the image is identified out, the processor 502 continues to perform the second operation to update the preset identification time until the position of the calibration region in the image cannot be identified out, then stops performing the second operation, and determines the preset identification time t updated in the second last of the second operation as a second optimal focus time, where $\Delta 2$ is a second preset time length.

In some embodiments, the calibration region includes a front calibration region and a rear calibration region, and the information code region is located between the front calibration region and the rear calibration region.

In some embodiments, the processor 502 includes: a focus module, configured to determine a focus parameter according to the position of the information code region in the image, and send the focus parameter to the image capture device, so that the image capture device captures the image of the information code region according to the focus parameter; and a processing module, configured to receive the image of the information code region captured by the image capture device, and binarize the image information of the information code region to obtain the information of the information code region.

In this embodiment, the focus module in the processor 502 determines the focus parameter according to the position of the information code region in the image, and sends the focus parameter to the image capture device, so that the image capture device adjusts hardware parameters thereof according to the focus parameter, and the image of the information code region is captured by using the adjusted image capture device. After the processing module in the processor 502 receives the image of the information code region captured by the image capture device 501, the image is binarized to present a black and white effect, and then the binarized image of the information code region is processed by using a barcode identification algorithm (for example, a Code128 identification algorithm) to obtain information of the image of the information code region, that is, the information of the barcode.

In some embodiments, the focus module includes: a determination module, configured to determine a length of the information code region according to a preset length of the front calibration region, a preset length of the rear calibration region, a preset interval width between the front calibration region and the information code region, and a preset interval width between the rear calibration region and the information code region; and a selection module, configured to select half of the length of the information code region as a focus width, and send the focus width to the image capture device. The image capture device 501 includes a focus sub-module, which is configured to receive the focus width and focus on the position of the information code region in the image based on the focus width.

In this embodiment, the focus module in the processor 502 includes a determination module and a selection module. The determination module may first determine the length of the information code region according to the preset length of the front calibration region, the preset length of the rear calibration region, the preset interval width between the front calibration region and the information code region, and the preset interval width between the rear calibration region and the information code region, and send the determined length of the information code region to the selection module. The selection module selects half of the length of the information code region as the focus width, and sends the focus width to the image capture device 501, and the focus sub-module in the image capture device 501 receives the focus width and focuses on the position of the information code region in the image based on the focus width.

In some embodiments, the difference between the width of a single black striped region of the calibration region and the width of a single black striped region of the information code region is greater than a preset width difference.

In some embodiments, the display 503 is further configured to receive and display the image of the information code region.

In this embodiment, the display 503 may further receive the image of the information code region, and display the image of the information code region.

The various units in the above-mentioned terminal 500 correspond to the steps in the methods described with reference to FIG. 2 and FIG. 3. Therefore, the above technical effects that can be achieved by the method for identifying a barcode are also applicable to the terminal 500 and the devices included therein, and details are not described herein again.

Figure 6:
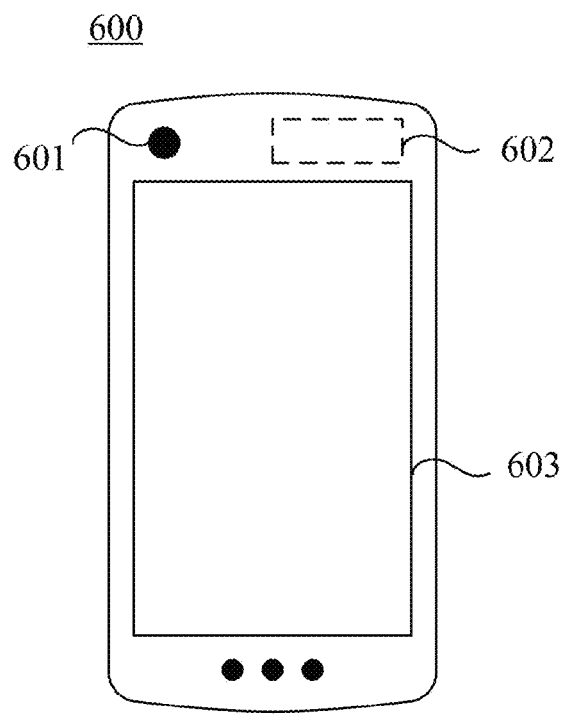
FIG. 6 is a schematic structural diagram of another embodiment of a terminal for identifying a barcode according to the present disclosure.

With further reference to FIG. 6, the present disclosure provides another embodiment of a terminal for identifying a barcode. As shown in FIG. 6, the terminal 600 for identifying a barcode in this embodiment may be a smart phone with an image capture device 601, a processor 602, and a display device 603. The terminal 600 obtains an image of the barcode by means of the image capture device 601, and identifies the position of a calibration region in the image according to preset calibration information of the calibration region. The processor 602 identifies the position of an information code region in the image according to the position of the calibration region in the image and a preset position relationship between the calibration region and the information code region in the image, acquires information based on the position of the information code region in the image to obtain information of the information code region, and displays the information on the display device 603.

According to the embodiments of the present disclosure, the present disclosure further provides an electronic device and a readable storage medium. The electronic device includes at least one processor; and a memory connected to the at least one processor by communication, the memory storing instructions executable by the at least one processor, and the instructions being executed by the at least one processor so that the at least one processor can perform the methods described in FIG. 2 and FIG. 3.

Figure 7:
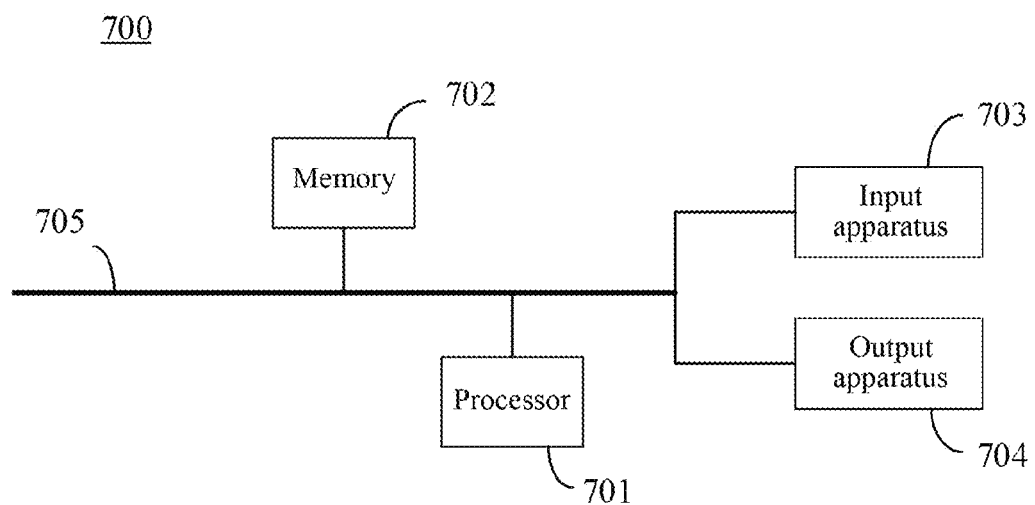
FIG. 7 is a block diagram of an electronic device used to implement the method for identifying a barcode according to the embodiments of the present disclosure.

As shown in FIG. 7, which is a block diagram of an electronic device of a method for identifying a barcode according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 7, the electronic device includes: one or more processors 701, a memory 702, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 7, one processor 701 is used as an example.

The memory 702 is a non-transitory computer readable storage medium provided by the present disclosure. The memory stores instructions executable by at least one processor, so that the at least one processor performs the method for identifying a barcode provided by the present disclosure. The non-transitory computer readable storage medium of the present disclosure stores computer instructions for causing a computer to perform the method for identifying a barcode provided by the present disclosure.

The memory 702, as a non-transitory computer readable storage medium, may be used to store non-transitory software programs, non-transitory computer executable programs and modules, such as program instructions/modules corresponding to the method for identifying a barcode in the embodiments of the present disclosure (for example, the image capture device 501, the processor 502, and the display 503 shown in FIG. 5). The processor 701 executes the non-transitory software programs, instructions, and modules stored in the memory 702 to execute various functional applications and data processing of the server, that is, to implement the method for identifying a barcode in the foregoing method embodiment.

The memory 702 may include a storage program area and a storage data area, where the storage program area may store an operating system and at least one function required application program; and the storage data area may store data created by the use of the electronic device according to the method for identifying a barcode, etc. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include memories remotely provided with respect to the processor 701, and these remote memories may be connected to the electronic device of the method for identifying a barcode through a network. Examples of the above network include but are not limited to the Internet, intranet, local area network, mobile communication network, and combinations thereof.

The electronic device of the method for identifying a barcode may further include: an input apparatus 703, an output apparatus 704 and the bus 705. The processor 701, the memory 702, the input apparatus 703, and the output apparatus 704 may be connected through a bus or in other methods. In FIG. 7, connection through a bus is used as an example.

The input apparatus 703 may receive input digital or character information, and generate key signal inputs related to user settings and function control of the electronic device of the method for identifying a barcode, such as touch screen, keypad, mouse, trackpad, touchpad, pointing stick, one or more mouse buttons, trackball, joystick and other input apparatuses. The output apparatus 704 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN) and the Internet.

The computer system may include a client and a server. The client and the server are generally far from each other and usually interact through the communication network. The relationship between the client and the server is generated by computer programs that run on the corresponding computer and have a client-server relationship with each other.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for identifying a barcode, wherein the barcode comprises a calibration region and an information code region, and the method comprises:
   obtaining an image of the barcode, and identifying a position of the calibration region in the image according to preset calibration information of the calibration region;
   identifying a position of the information code region in the image according to the position of the calibration region in the image and a preset position relationship between the calibration region and the information code region in the image; and
   acquiring information based on the position of the information code region in the image to obtain information of the information code region,
   wherein obtaining an image of the barcode, and identifying a position of the calibration region in the image according to preset calibration information of the calibration region comprises:
   obtaining a predetermined optimal focus time; and
   obtaining the image of the barcode, and identifying the position of the calibration region in the image within the optimal focus time according to the preset calibration information of the calibration region.

2. The method according to claim 1, wherein the optimal focus time is determined as follows, comprising:
   performing, when the position of the calibration region in the image is not identified out within a preset identification time t, iteratively a first operation: updating the preset identification time to be t=t+Δ1, and identifying the position of the calibration region in the image within the updated preset identification time t;
   stopping, in response to the position of the calibration region in the image being identified out within the updated preset identification time t, performing the first operation, and determining the preset identification time t updated in the last of the first operation as the optimal focus time, wherein Δ1 is a first preset time length; and
   performing, when the position of the calibration region in the image is identified out within the preset identification time t, iteratively a second operation: updating the preset identification time to be t=t−Δ2, and identifying the position of the calibration region in the image within the updated preset identification time;
   stopping, in response to the position of the calibration region in the image being not identified out within the updated preset identification time t, performing the second operation, and determining the preset identification time t updated in the second last of the second operation as the optimal focus time, wherein Δ2 is a second preset time length.

3. The method according to claim 1, wherein the calibration region comprises a front calibration region and a rear calibration region, and the information code region is located between the front calibration region and the rear calibration region.

4. The method according to claim 3, wherein acquiring information based on the position of the information code region in the image to obtain information of the information code region comprises:
   focusing on the position of the information code region in the image to collect image information of the information code region; and
   binarizing the image information of the information code region to obtain the information of the information code region.

5. The method of claim 4, wherein focusing on the position of the information code region in the image comprises:
   determining a length of the information code region according to a preset length of the front calibration region, a preset length of the rear calibration region, a preset interval width between the front calibration region and the information code region, and a preset interval width between the rear calibration region and the information code region;
   selecting half of the length of the information code region as a focus width; and
   focusing on the position of the information code region in the image by using the focus width.

6. The method according to claim 1, wherein a difference between a width of a single black striped region of the calibration region and a width of a single black striped region of the information code region is greater than a preset width difference.

7. A terminal for identifying a barcode, wherein the barcode comprises a calibration region and an information code region, and the terminal comprises an image capture device, a processor, and a display, wherein
   the image capture device is configured to obtain an image of the barcode and send the image of the barcode to the processor;
   the processor is configured to receive the image of the barcode, identify a position of the calibration region in the image according to preset calibration information of the calibration region, identify a position of the information code region in the image according to the position of the calibration region in the image and a preset position relationship between the calibration region and the information code region in the image, determine focus information used to control a focus position of the image capture device according to the position of the information code region in the image, and send the focus information to the image capture device;
   the image capture device is further configured to perform image capture according to the focus information, obtain an image of the information code region, and send the image of the information code region to the processor; and
   the processor is further configured to receive the image of the information code region, identify information of the information code region according to the image of the information code region, and send the information of the information code region to the display;
   the display is configured to receive and display the information of the information code region,
   wherein the processor comprises:
   a time selection module, configured to obtain a predetermined optimal focus time; and
   a position identification module, configured to identify, based on the image of the barcode, the position of the calibration region in the image within the optimal focus time according to the preset calibration information of the calibration region.

8. The terminal according to claim 7, wherein the optimal focus time is determined as follows:

performing, when the position of the calibration region in the image is not identified out within a preset identification time t, iteratively a first operation: updating the preset identification time to be t=t+Δ1, and controlling the image capture device to capture a regional image based on the position of the calibration region in the image;

stopping, in response to the processor identifying the position of the calibration region in the image out according to the regional image captured by the image capture device within the updated preset identification time t, performing the first operation, and determining the preset identification time t updated in the last of the first operation as the optimal focus time, wherein Δ1 is a first preset time length; and performing, when the position of the calibration region in the image is identified out within the preset identification time t, iteratively a second operation: updating the preset identification time to be t=t−Δ2, and controlling the image capture device to capture a regional image on the position of the calibration region in the image;

stopping, in response to the processor not identifying the position of the calibration region in the image out according to the regional image captured by the image capture device within the updated preset identification time t, performing the second operation, and determining the preset identification time t updated in the second last of the second operation as the optimal focus time, wherein Δ2 is a second preset time length.

9. The terminal according to claim 7, wherein the calibration region comprises a front calibration region and a rear calibration region, and the information code region is located between the front calibration region and the rear calibration region.

10. The terminal according to claim 9, wherein the processor comprises:

a focus module, configured to determine a focus parameter according to the position of the information code region in the image, and send the focus parameter to the image capture device, so that the image capture device captures the image of the information code region according to the focus parameter; and a processing module, configured to receive the image of the information code region captured by the image capture device, and binarize the image information of the information code region to obtain the information of the information code region.

11. The terminal according to claim 9, wherein the focus module comprises:

a determination module, configured to determine a length of the information code region according to a preset length of the front calibration region, a preset length of the rear calibration region, a preset interval width between the front calibration region and the information code region, and a preset interval width between the rear calibration region and the information code region; and a selection module, configured to select half of the length of the information code region as a focus width, and send the focus width to the image capture device;

wherein the image capture device comprises:

a focus sub-module, configured to receive the focus width and focus on the position of the information code region in the image based on the focus width.

12. The terminal according to claim 7, wherein a difference between a width of a single black striped region of the calibration region and a width of a single black striped region of the information code region is greater than a preset width difference.

13. The terminal according to claim 7, wherein the display is further configured to receive and display the image of the information code region.

14. An electronic device, comprising:

at least one processor; and a memory connected to the at least one processor by communication, wherein the memory stores instructions executable by the at least one processor, and the instructions are executed by the at least one processor, so that the at least one processor can perform operations for processing appliance demand information, the operations comprising:

obtaining an image of the barcode, and identifying a position of the calibration region in the image according to preset calibration information of the calibration region;

identifying a position of the information code region in the image according to the position of the calibration region in the image and a preset position relationship between the calibration region and the information code region in the image; and acquiring information based on the position of the information code region in the image to obtain information of the information code region, wherein obtaining an image of the barcode, and identifying a position of the calibration region in the image according to preset calibration information of the calibration region comprises:

obtaining a predetermined optimal focus time; and obtaining the image of the barcode, and identifying the position of the calibration region in the image within the optimal focus time according to the preset calibration information of the calibration region.

15. The electronic device according to claim 14, wherein the optimal focus time is determined as follows, comprising:

performing, when the position of the calibration region in the image is not identified out within a preset identification time t, iteratively a first operation: updating the preset identification time to be t=t+Δ1, and identifying the position of the calibration region in the image within the updated preset identification time t;

stopping, in response to the position of the calibration region in the image being identified out within the updated preset identification time t, performing the first operation, and determining the preset identification time t updated in the last of the first operation as the optimal focus time, wherein Δ1 is a first preset time length; and performing, when the position of the calibration region in the image is identified out within the preset identification time t, iteratively a second operation: updating the preset identification time to be t=t−Δ2, and identifying the position of the calibration region in the image within the updated preset identification time;

stopping, in response to the position of the calibration region in the image being not identified out within the updated preset identification time t, performing the second operation, and determining the preset identification time t updated in the second last of the second operation as the optimal focus time, wherein Δ2 is a second preset time length.

16. The electronic device according to claim 15, wherein acquiring information based on the position of the information code region in the image to obtain information of the information code region comprises:
  focusing on the position of the information code region in the image to collect image information of the information code region; and
  binarizing the image information of the information code region to obtain the information of the information code region.

17. The electronic device according to claim 14, wherein the calibration region comprises a front calibration region and a rear calibration region, and the information code region is located between the front calibration region and the rear calibration region.

\* \* \* \* \*